United States Patent [19]

Petersen

[11] Patent Number: 4,784,442
[45] Date of Patent: Nov. 15, 1988

[54] BRAKE PEDAL VALVE WITH SETPOINT ADJUSTER INCLUDING DISPLACEMENT AND FORCE SENSORS FOR ELECTRICALLY CONTROLLED BRAKE SYSTEM

[75] Inventor: Erwin Petersen, Wunstorf, Fed. Rep. of Germany

[73] Assignee: WABCO Westinghouse Fahrzeugbremsen GmbH, Hanover, Fed. Rep. of Germany

[21] Appl. No.: 150,104

[22] Filed: Jan. 29, 1988

Related U.S. Application Data

[63] Continuation of Ser. No. 827,842, Feb. 7, 1986, abandoned.

[30] Foreign Application Priority Data

Feb. 7, 1985 [DE] Fed. Rep. of Germany ....... 3504096

[51] Int. Cl.⁴ .................. B60T 13/66; B60T 17/18; G05B 9/03
[52] U.S. Cl. .................................. 303/15; 74/514; 188/156; 188/158; 303/3; 303/20; 303/50; 303/100; 303/104; 303/DIG. 3; 303/101; 303/52; 364/426.01
[58] Field of Search .................................. 303/2—3, 303/13–15, DIGS. 1–4, 20, 93, 1, 50–56, 101, 100, 7, 104; 188/155-165, 196 R, 106 F, 382; 74/512, 514, 560; 338/108, 47, 153, 39; 60/545; 318/623–626, 481; 364/426; 73/161, 132

[56] References Cited

U.S. PATENT DOCUMENTS

| | | | |
|---|---|---|---|
| 1,952,679 | 3/1934 | Leveen | 188/158 X |
| 3,131,975 | 5/1964 | Smith et al. | 303/104 |
| 3,398,994 | 8/1968 | Smith | 303/104 |
| 3,486,799 | 12/1969 | Greentree | 303/3 X |
| 3,507,542 | 4/1970 | Cannella | 303/15 X |
| 3,744,852 | 7/1973 | Riordan | 303/104 |
| 4,043,608 | 8/1977 | Bourg et al. | 303/104 |
| 4,181,366 | 1/1980 | Dobner | 188/156 X |
| 4,234,063 | 11/1980 | Blake | 188/156 X |
| 4,316,640 | 2/1982 | Cripe | 303/15 X |
| 4,327,414 | 4/1982 | Klein | 303/93 X |
| 4,365,847 | 12/1982 | Martin | 303/104 X |
| 4,436,347 | 3/1984 | Stumpe | 303/52 X |
| 4,671,576 | 6/1987 | Fourie | 303/15 X |

FOREIGN PATENT DOCUMENTS

| | | | |
|---|---|---|---|
| 2642041 | 3/1978 | Fed. Rep. of Germany | 303/3 |
| 2937657 | 4/1981 | Fed. Rep. of Germany | 303/52 |
| 3504096 | 8/1986 | Fed. Rep. of Germany | 303/20 |
| 1508303 | 4/1978 | United Kingdom | 303/3 |

Primary Examiner—Douglas C. Butler
Attorney, Agent, or Firm—J. O. Ray, Jr.

[57] ABSTRACT

A setpont adjuster for a brake pedal in a motor vehicle to control an electric brake system. The setpoint adjuster includes a displacement sensor and a force sensor in parallel-connection, in which the force sensor supplies the reference value. Electronic main circuits are connected subsequently to the sensors and test the signals of the sensors for reasonableness according to different criteria and control a warning light in case of a fault.

6 Claims, 2 Drawing Sheets

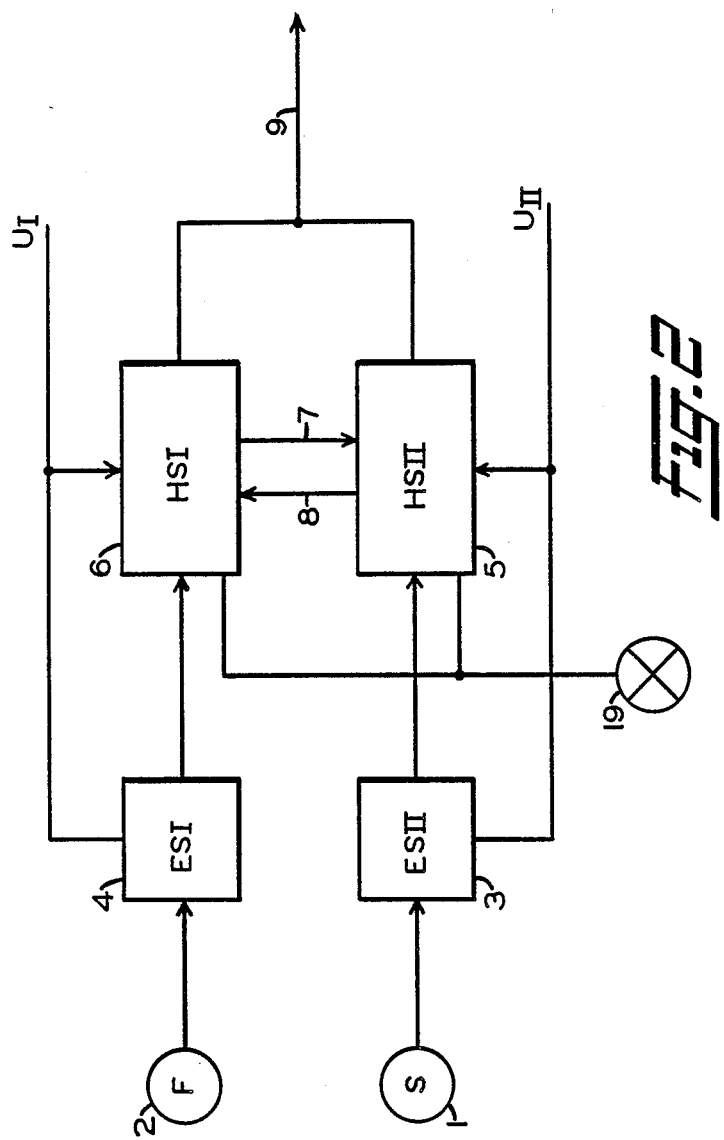

4,784,442

BRAKE PEDAL VALVE WITH SETPOINT ADJUSTER INCLUDING DISPLACEMENT AND FORCE SENSORS FOR ELECTRICALLY CONTROLLED BRAKE SYSTEM

This is a continuation of co-pending application Ser. No. 827,842, filed on Feb. 7, 1986, now abandoned.

BACKGROUND OF THE INVENTION

The present invention relates, in general, to electrically-controlled brake systems and, more particularly, the invention relates to a setpoint adjuster for the control of such electrically-operated brake system.

As is known in the braking art, in order to control the electronic system in an electrically-controlled brake system, the pedal-operated brake valve must at least contain a sensor. Such sensor may be, for example, a slide resistance contained in the electrical circuitry. A brake valve of this kind, which is usually designed for two circuits, will generally have two built-in electric signal transmitters. A brake valve with an attached potentiometer has also been taught for use in this application.

As would be expected, particularly effective safety features are to be required for brake systems of motor vehicles. For instance, should one of the two signal transmitters break down, at least a limited braking effect must still be possible.

This same requirement is retained for the case when one of the two signal transmitters or sensors, respectively, transmits a faulty signal. As, in such a case, it may be unknown which of the two sensors has provided the erroneous signal, suitable criteria must be incorporated into the system for the detection of the signal which has broken down and for disregarding it.

The obvious solution, prior to the present invention, might be the use of three sensors, and to switch OFF the signal of the one sensor which is broken down. In this case, it is assumed that the concurring signals of the two other sensors have not broken down. This solution, however, has the disadvantage of higher expense for construction. In addition, it provides one more sensor which must be maintained, thereby adding to the overall operating cost of the vehicle.

The use of a potentiometer or displacement transducer, respectively, as an electrical component for the control of the electric brake system—which is an obvious solution known to the art—likewise has certain disadvantages. The displacement signal may scatter when the spring characteristic is changed. This would especially be the case in a cold environment. This makes sufficient repeating accuracy, under differing operational conditions, almost impossible.

SUMMARY OF THE INVENTION

The present invention teaches a setpoint adjuster to control an electrical brake system and, in particular, the brake pedal portion of such brake system. The setpoint adjuster of the present invention includes both a displacement sensor and a force sensor connected in parallel relationship. In the arrangement of this invention, the force sensor supplies the reference value. Accordingly, the main electronic circuits are connected subsequently to each of the sensors and test the signals from the sensors for reasonableness. These tests are conducted using different criteria, and control a warning light in case of an erroneous signal.

OBJECTS OF THE INVENTION

It is, therefore, one of the objects of the present invention to provide a setpoint adjuster for an electrically-controlled brake system, which offers a maximum of accuracy combined with low construction expense.

Another object of the present invention is to provide a setpoint adjuster for an electrically-controlled brake system in which the reasonableness of various signals can be tested.

Still another object of the present invention is to provide a setpoint adjuster for an electrically-controlled brake system in which the test of such signals from the sensors includes tests during both braking and nonbraking conditions.

Yet another object of the invention is to provide a setpoint adjuster for an electrically-controlled brake system in which the brake system includes a means for providing a brief decrease of the braking force for the purpose of testing the reaction of the operator of the motor vehicle.

An additional object of the present invention is to provide a setpoint adjuster for an electrically-controlled brake system in which the brake system includes a means for testing the coordination of the two input signals over a predetermined range of braking values.

The above objects and advantages of the present invention, in addition to various other objects and advantages, will become more readily apparent to persons skilled in the electrically-operated braking art, from the following the more detailed description, when such description is taken in conjunction with the attached drawings and the appended claims.

BRIEF DESCRIPTION OF THE DRAWINGS

FIG. 2 is a schematic block diagram of an electronic letters-figures recognizer for the two sensors installed in the brake valve according to the present invention.

In the drawings, identical components have been identified with identical reference numerals for the purpose of clarity.

Figure 1:
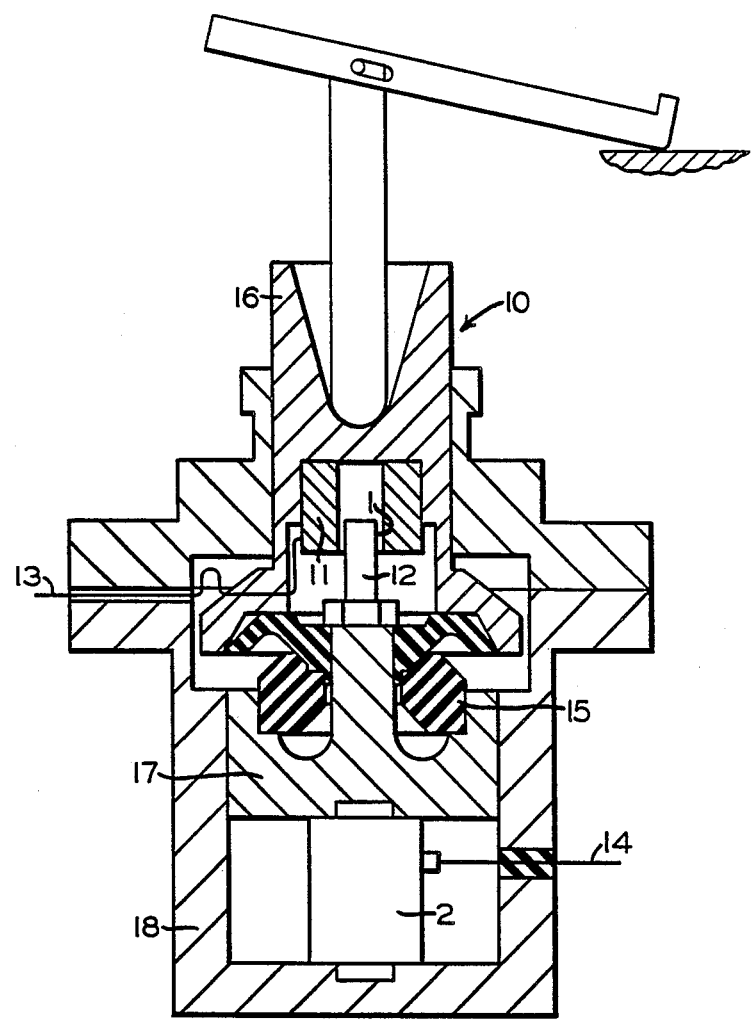
FIG. 1 is a view in cross-section of a pedal-operated brake valve constructed in accordance with the principles of the present invention.

Now refer to FIG. 1, which shows the lower part of a pedal-operated brake valve, generally designated 10. The brake valve 10 is shown without a running plate and the usual fluid pressure connections such brake valve 10 inherently possesses. The running plate (not shown) is actuated by the driver, and presses on a member 16. The member 16 then transmits the pedal force applied by the operator of the vehicle by way of a ring-shaped rubber spring 15 to a member 17. A steel spring, for instance, as an alternative, can be substituted for the rubber spring 15. The displacement of the running plate is measured by a displacement sensor 1. Displacement sensor 1 consists of a coil 11 and an iron core 12. The output signal, from the displacement sensor 1, is transmitted via an output line 13.

The pedal force exerted by the driver is measured by a force sensor 2. The force sensor 2 is positioned between the member 17 and the housing 18 of the pedal-operated brake valve 10. The force sensor 2 sends an electrical signal to the outside, through an output line 14, as a reference value for the control of an electric brake system on the motor vehicle.

Now refer to FIG. 2, which shows schematically, a block diagram for the evaluation of the output signals of the two sensors 1 and 2. The signal of the sensor 2 (force sensor) is transmitted to an input circuit 4 (ES I), where it is filtered and digitized. The signal is then transmitted by way of a main circuit 6 (HS I) to an output line 9. As described below, the sensor signal is examined for reasonableness in the main circuit 6.

Accordingly, the output signal of the sensor 1 (displacement sensor) is sent by way of an input circuit 3 (ES II) to a second main circuit 5 (HS II) and from here, to the common output line 9. The main electronic circuits 5 and 6 can exchange data by way of the connecting lines 7 and 8. The two branches ES I, HS I, and ES II, HS II are supplied by two separate power sources U I and U II. The circuits 5 and 6 are designed in such a way that only the output signal of sensor 2 (force sensor) is switched ON to the output line 9, as long as both sensors 1 and 2 are found to be in faultless condition. Consequently, the subsequently-connected two braking circuits (not represented) always receive the same setpoint, even when the output voltages of the sensors 1 and 2 drift apart with prolonged operation.

The reasonableness of the output signals of the two sensors 1 and 2 is monitored according to the four principles described below.

The first principle stipulates that the two sensor signals cannot change faster than can be effected during braking by a very fast driver, or during release of the brake by the restoring spring. If, then, the signal of one sensor rises or falls faster than admissible, the respective main circuit 5 or 6 indicates a breakdown on a warning light 19. The subsequent brake action is then controlled by the undamaged sensor.

If both values of the sensors 1 and 2 rise inadmissibly fast, "breakdown" is also indicated. If, in this case, the signal of the displacement sensor 1 rises to the limit value and then remains constant, and if simultaneously, the signal of the sensor 2 shows a value which is higher than the corresponding force value, the desire for panic-braking is assumed and an accordingly high braking impulse is released.

If the signals of both sensors 1 and 2 fall inadmissibly fast, the braking force is slowly decreased. This brings the vehicle to a halt; if necessary, the emergency brake may be used in addition.

The second criterion stipulates that during the absence of braking action, both sensors 1 and 2 transmit defined output values, which must be not equal to zero and not equal to the maximum value. Under faultless conditions, the sensors 1 and 2 do not reach the electrically-possible maximum values, even with maximum physical values of braking action.

If, during a breakdown, the displacement sensor 1 reaches an impossibly high value or zero, a fault is indicated, if the condition continues over a predetermined period of time.

If the force sensor 2 reaches an impossibly high value or zero, the value of the displacement sensor 1 is taken as a reference value, and a breakdown is indicated if the condition continues over a predetermined period of time.

If both sensors 1 and 2 reach impossible values, a slow braking action is executed, and a breakdown is indicated as well.

The third criterion stipulates that the signals of sensors 1 and 2 can only be constant over a prolonged period of time, when no braking occurs; for example, when the brake pedal touches the mechanical stop. During gradual brake action, on the other hand, the pedal will always execute slight movements.

If the displacement sensor 1 remains constant on one value, corresponding neither to the inactuated position nor to the rubber spring 15 stop, a breakdown is indicated after a short delay and force sensor 2 is used for braking.

If the force sensor 2 remains constant within the usual operational range, the brake force is briefly and slightly decreased by the main circuit 6 (HS I). The driver will react by braking with more intensity. If the output values of the force sensor 2 still remain constant while the displacement sensor 1 reacts, a breakdown is indicated and the value of the faultless displacement sensor 1 is assumed.

If the output values of both sensors 1 and 2 remain constant for a prolonged period of time, within the usual operational range, a braking machine or a firm stop have evidently been used in the vehicle. In this case, the value of the force sensor 2 is assumed.

The fourth principle stipulates that under faultless conditions, both output signals must be coordinated firmly and with certain tolerances under any operating conditions or braking conditions, respectively.

If this coordination is interrupted by the signals from the sensors 1 and 2, a breakdown is indicated.

The above-described reasonableness tests are, of course, also applicable to arrangements with two equal or different force sensors.

While the presently-preferred as well as alternative embodiments of the present invention have been described in detail above, it should be obvious to those persons skilled in the electrical braking art that other modifications and adaptations can be made without departing from the spirit and scope of the appended claims.

I claim:

1. An apparatus to determine a displacement of an operator-actuated brake force applicator on a motor vehicle equipped with an electrically controlled brake system, said apparatus comprising:
    (a) a brake valve positioned on such motor vehicle;
    (b) a first member positioned at least partially within said brake valve and engageable with such brake force applicator;
    (c) a first sensing means positioned within said first member for measuring a displacement of such brake force applicator and for transmitting an output signal value representative of said displacement;
    (d) a second member positioned within said brake valve;
    (e) a force transmitting means positioned between said first member and said second member for transmitting a force from said first member to said second member during a brake application;
    (f) a second sensing means positioned to engage said second member for measuring a force exerted by said second member and for transmitting an output signal value representative of said force being exerted by said second member;
    (g) a first electrical signal evaluation circuit connected to receive said output signal value from said second sensing means;
    (h) a second electrical signal evaluation circuit connected to receive said output signal value from said first sensing means;

(i) at least one of said first electrical signal evaluation circuit and said second electrical signal evaluation circuit including a means for monitoring a reasonableness of said output signal value of each of said first sensing means and said second sensing means according to predetermined conditions; and (j) a means connected to at least one of said first electrical signal evaluation circuit and said second electrical signal evaluation circuit for transmitting a brake force signal value representative of said displacement of such brake force applicator to such electrically controlled brake system.

2. An apparatus to determine a displacement of an operator-actuated brake force applicator on a motor vehicle, according to claim 1, wherein said first sensing means is a displacement sensor.

3. An apparatus to determine a displacement of an operator-actuated brake force applicator on a motor vehicle, according to claim 2, wherein said displacement sensor includes a coil engageable with said first member and an iron core engageable with said second member.

4. An apparatus to determine a displacement of an operator-actuated brake force applicator on a motor vehicle, according to claim 1, wherein said second sensing means is a force sensor.

5. An apparatus to determine a displacement of an operator-actuated brake force applicator on a motor vehicle, according to claim 1, wherein said first sensing means and said second sensing means are positioned mechanically in series and electrically connected in a parallel relationship.

6. An apparatus to determine a displacement of an operator-actuated brake force applicator on a motor vehicle, according to claim 1, wherein said first electrical signal evaluation circuit is powered by a first power source and said second electrical signal evaluation circuit is powered by a second power source.

* * * * *